(12) United States Patent
Stager et al.

(10) Patent No.: US 7,490,103 B2
(45) Date of Patent: Feb. 10, 2009

(54) METHOD AND SYSTEM FOR BACKING UP DATA

(75) Inventors: Roger Keith Stager, Livermore, CA (US); Donald Alvin Trimmer, Livermore, CA (US); Pawan Saxena, Pleasanton, CA (US); Craig Anthony Johnston, Livermore, CA (US); Yafen Peggy Chang, Fremont, CA (US); Rico Blaser, San Franciso, CA (US)

(73) Assignee: NetApp, Inc., Sunnyvale, CA (US)

( * ) Notice: Subject to any disclaimer, the term of this patent is extended or adjusted under 35 U.S.C. 154(b) by 340 days.

(21) Appl. No.: 11/051,793

(22) Filed: Feb. 4, 2005

(65) Prior Publication Data

US 2005/0216536 A1   Sep. 29, 2005

Related U.S. Application Data

(60) Provisional application No. 60/541,626, filed on Feb. 4, 2004, provisional application No. 60/542,011, filed on Feb. 5, 2004.

(51) Int. Cl.
*G06F 17/00* (2006.01)

(52) U.S. Cl. .................... 707/103 R; 707/102; 707/101; 707/104.1

(58) Field of Classification Search ............. 707/103 R, 707/101, 102, 104.1
See application file for complete search history.

(56) References Cited

U.S. PATENT DOCUMENTS

| | | | |
|---|---|---|---|
| 4,635,145 A | 1/1987 | Horie et al. | |
| 4,727,512 A | 2/1988 | Birkner et al. | |
| 4,775,969 A | 10/1988 | Osterlund | |
| 5,235,695 A | 8/1993 | Pence | |
| 5,297,124 A | 3/1994 | Plotkin et al. | |
| 5,438,674 A | 8/1995 | Keele et al. | |
| 5,455,926 A | 10/1995 | Keele et al. | |
| 5,485,321 A | 1/1996 | Leonhardt et al. | |
| 5,666,538 A | 9/1997 | DeNicola | |
| 5,673,382 A | 9/1997 | Cannon et al. | |
| 5,774,292 A | 6/1998 | Georgiou et al. | |
| 5,774,643 A | 6/1998 | Lubbers et al. | |
| 5,774,715 A | 6/1998 | Madany et al. | |

(Continued)

FOREIGN PATENT DOCUMENTS

EP    1 333 379    4/2006

(Continued)

OTHER PUBLICATIONS

SEcond Copy 7, 1991-2007 Centered System.*

(Continued)

*Primary Examiner*—Sana Al-Hashemi
(74) *Attorney, Agent, or Firm*—Perkins Coie LLP

(57) ABSTRACT

A method and system for generating a snapshot in a consistent state is disclosed. The system comprises a host computer, a primary data storage, a data protection unit, and a secondary data storage. The data protection unit monitors a state of an application which is running on the host computer. The data protection unit generates a snapshot of data stored in a primary data storage when the application is in a consistent state, and stores the snapshot on a secondary storage. In the event of a system failure, the data is recovered using the last snapshot.

18 Claims, 3 Drawing Sheets

U.S. PATENT DOCUMENTS

| | | | |
|---|---|---|---|
| 5,805,864 A | 9/1998 | Carlson et al. | |
| 5,809,511 A | 9/1998 | Peake | |
| 5,809,543 A | 9/1998 | Byers et al. | |
| 5,854,720 A | 12/1998 | Shrinkle et al. | |
| 5,864,346 A | 1/1999 | Yokoi et al. | |
| 5,872,669 A | 2/1999 | Morehouse et al. | |
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 | 7/2001 | Dunham | |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 * | 4/2005 | Hart et al. | 707/201 |
| 6,915,397 B2 | 7/2005 | Lubbers et al. | |
| 6,931,557 B2 | 8/2005 | Togawa | |
| 6,950,263 B2 | 9/2005 | Suzuki et al. | |
| 6,973,369 B2 | 12/2005 | Trimmer et al. | |
| 6,973,534 B2 | 12/2005 | Dawson | |
| 6,978,325 B2 | 12/2005 | Gibble | |
| 7,032,126 B2 | 4/2006 | Zalewski et al. | |
| 7,055,009 B2 | 5/2006 | Factor et al. | |
| 7,072,910 B2 | 7/2006 | Kahn et al. | |
| 7,096,331 B1 | 8/2006 | Haase et al. | |
| 7,100,089 B1 | 8/2006 | Phelps | |
| 7,111,136 B2 | 9/2006 | Yamagami | |
| 7,127,388 B2 | 10/2006 | Yates et al. | |
| 7,127,577 B2 | 10/2006 | Koning et al. | |
| 7,152,077 B2 | 12/2006 | Veitch et al. | |
| 7,155,586 B1 | 12/2006 | Wagner et al. | |
| 2001/0047447 A1 | 11/2001 | Katsuda | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0144057 A1 | 10/2002 | Li et al. | |
| 2002/0163760 A1 | 11/2002 | Lindsay et al. | |
| 2002/0166079 A1 | 11/2002 | Ulrich et al. | |
| 2002/0199129 A1 | 12/2002 | Bohrer et al. | |
| 2003/0004980 A1 | 1/2003 | Kishi et al. | |
| 2003/0037211 A1 | 2/2003 | Winokur | |
| 2003/0120476 A1 | 6/2003 | Yates et al. | |
| 2003/0120676 A1 | 6/2003 | Holavanahalli et al. | |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182301 A1 | 9/2003 | Patterson et al. | |
| 2003/0182350 A1 | 9/2003 | Dewey | |
| 2003/0188208 A1 | 10/2003 | Fung | |
| 2003/0217077 A1 | 11/2003 | Schwartz et al. | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |
| 2006/0235907 A1 * | 10/2006 | Kathuria et al. | 707/204 |

FOREIGN PATENT DOCUMENTS

| | | |
|---|---|---|
| EP | 1 671 231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023991 | 3/2006 |

| | | |
|---|---|---|
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Alacritus Software's Securitus I: Pointing the Way to Virtual Tape Libraries" Aberdeen Group, Inc., Mar. 2002.

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the Way to Virtual Tape Libraries" Aberdeen Group, Inc., Jul. 2003.

"Alacritus Software's Securitus: Defining the Way to Virtual Tape Libraries" Aberdeen Group, Inc., Jul. 2003.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library Support for Legato NetWorker Data Protection Solution" Alacritus Software, Inc., Jan. 8, 2002.

Camphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.

Biggar, Heidi, "Alacritus Enables Disk-Based Backup" InfoStor, Sep. 2001.

"Securitus I White Paper: Disk Based Data Protection from Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ, "Alacritus Software Announces New Customers for Securitus VTLA" Alacritus Software, Jan. 13, 2004.

Baltazar, Henry "Weaving Apps Into SAN Fabric" eWEEK, Mar. 24, 2003.

Baltazar, Henry "More Intelligence is on the Way" eWEEK, Sep. 15, 2003.

Barrett, Alex "The Case for Network Smarts" Storage Magazine, Jun. 2003.

"Securitus White Paper: Disk Based Data Protection from Alacritus Software" Alacritus Website, Oct. 2003.

"Manageability: Securitus v. Tape" Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.

"No Changes Required: Securitus v. Tape" Alacritus Website, Oct. 2003.

"Customer Success" Alacritus Website, Oct. 2003.

"Chronospan" Alacritus Website, Oct. 2003.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companties to Provide First Network-Intelligent Virtual Tape Solution Resulting in Dramatic ROI, Increases in Data Backup Performance and Scalability" Alacritus Software, Jul. 8, 2002.

Komiega, Kevin, "Vendor Pushes Disk Backup Over Tape" SearchStorage.com Jan. 10, 2003.

"Testimonials" Alacritus Website, Oct. 2003.

"Seamless Integration" Alacritus Website, Oct. 2003.

"Topologies" Alacritus Website, Oct. 7, 2003.

"Securitus" Alacritus Website, Oct. 2003.

"Scalability: Securitus v. Tape" Alacritus Website, Oct. 2003.

"Strengths: Securitus v. Tape" Alacritus Website, Oct. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies Backup Management", Dec. 7, 2004.

"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

* cited by examiner

METHOD AND SYSTEM FOR BACKING UP DATA

CROSS REFERENCE TO RELATED APPLICATIONS

This application claims priority from U.S. provisional application Nos. 60/541,626 filed Feb. 4, 2004 and 60/542,011 filed Feb. 5, 2004, which are incorporated by reference as if fully set forth herein.

FIELD OF INVENTION

The present invention relates to data backup. More particularly, the present invention is a method and system for generating a snapshot in a consistent state.

BACKGROUND

Many schemes have been developed to protect data from loss or damage. One such scheme is hardware redundancy, such as redundant arrays of independent disks (RAID). Unfortunately, hardware redundancy schemes are ineffective in dealing with logical data loss or corruption. For example, an accidental file deletion or virus infection is automatically replicated to all of the redundant hardware components and can neither be prevented nor recovered from when using such technologies.

To overcome this problem, backup technologies have been developed to retain multiple versions of a production system over time. This allowed administrators to restore previous versions of data and to recover from data corruption.

One type of data protection system involves making point in time (PIT) copies of data. A first type of PIT copy is a hardware-based PIT copy, which is a mirror of a primary volume onto a secondary volume. The main drawbacks of the hardware-based PIT copy are that the data ages quickly and that each copy takes up as much disk space as the primary volume. A software-based PIT, or so called "snapshot," is a "picture" of a volume at the block level or a file system at the operating system level.

It is desirable to generate a snapshot when an application or a file system is in a consistent state because it alleviates the need to replay a log of write streams and allows applications to be restarted rapidly. In order to achieve this, prior art systems suspend an application to update source data and flushes the source data to primary storage before generating a snapshot. However, this method is not efficient because the system has to be suspended for a while in order to generate a snapshot. Therefore, there is a need for a method and system for generating a snapshot in a consistent state without suspending an application or a system.

SUMMARY

The present invention is a method and system for generating a snapshot in a consistent state. The system comprises a host computer, primary data storage, a data protection unit, and secondary data storage. The data protection unit monitors a state of an application which is running on the host computer. The data protection unit generates a snapshot of data stored in primary data storage when the application is in a consistent state, and stores the snapshot on secondary storage. In the event of a system failure, the data is recovered using the last snapshot. Snapshot generation may be triggered either by storing a data on a secondary storage or marking data that already exists on the secondary storage.

Alternatively, the system may identify a consistent snapshot by analyzing previous write streams. Snapshots are generated in accordance with a snapshot generation policy. In the event of a system failure, the data protection unit identifies a snapshot which is generated in a consistent state among a plurality of snapshots. The data is recovered from the identified snapshot.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1A:
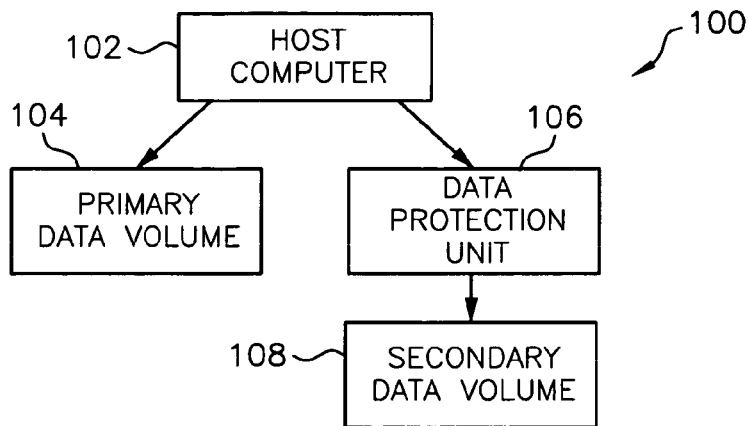
FIGS. 1A-1C are block diagrams of systems for data backup in accordance with the present invention.

The present invention will be described with reference to the drawing figures wherein like numerals represent like elements throughout. The present invention may be implemented, purely by way of example, in a Chronospan system, such as is described in U.S. patent application Ser. No. 10/771,613, which is incorporated by reference as if fully set forth.

FIG. 1A shows a system 100 for data backup in accordance with one embodiment of the present invention. The system 100 comprises a host computer 102, a primary data volume 104 (the primary data volume may also be referred to as the protected volume), a data protection unit 106, and a secondary data volume 108. The host computer 102 is connected directly to the primary data volume 104 and to the data protection unit 106. The data protection unit 106 manages the secondary data volume 108. The configuration of the system 100 minimizes the lag time by writing directly to the primary data volume 104 and permits the data protection unit 106 to focus exclusively on managing the secondary data volume 108. The management of the volumes is preferably performed using a volume manager (not shown).

A volume manager is a software module that runs on the host computer 102 or an intelligent storage switch 142 (see FIG. 1C) to manage storage resources. Typical volume managers have the ability to aggregate blocks from multiple different physical disks into one or more virtual volumes. Applications are not aware that they are actually writing to segments of many different disks because they are presented with one large, contiguous volume. In addition to block aggregation, volume managers usually offer software RAID functionality. For example, they are able to split the segments of the different volumes into two groups, where one group is a mirror of the other group. In this embodiment, the volume manager mirrors the writes to both the primary data volume 104 and the data protection unit 106 for redundancy in case of a hardware failure. Therefore, the volume manager also sends copies of all writes to the data protection unit 106.

The data protection unit 106 controls generation of snapshots. A plurality of snapshots are generated, stored and expired in accordance with a snapshot generation policy. The host computer 102 runs an application. Hereinafter, the terminology "application" means any software running on a computer or a file management system for managing and storing data including, but not limited to, a database system, an email system or a file system. The application running on the host computer 102 generates an output and the output is preferably stored in a memory (not shown) in the host computer. The output in the memory is flushed into the primary data volume 104 when the memory is full or a predetermined time expires or instructed by the application. Alternatively, the output may be directly stored in the primary volume.

The application running on the host computer 102 generates information which may be used in determining whether the application is in a consistent state or not. Various schemes may be used for this purpose. For example, a file system may be configured to generate an indicator that the system is in a consistent state. More particularly, the file system may set specific bits to indicate that the file system is in a clean state. The system reads the specific bit to figure out whether the system is in a consistent state, and generates a snapshot when the bits are set. Alternatively, it is possible to analyze the log of a journaling system to find out a consistent state when the log is empty.

The data protection unit 106 monitors state information in real time and detects when the application is in a consistent state. The data protection unit 106 generates a snapshot when the application is in a consistent state. With this scheme, in the case of a system failure, the need to replay a log of write streams to recover data is substantially alleviated, and the application may be restarted more rapidly. The snapshots do not have to be absolutely consistent. The snapshots may be generated slightly before or after the consistent point. The snapshots may be generated at any point that may be a good time in practice, (i.e., any time that requires a small time for replaying the log is a good candidate).

The consistent point may vary from application to application. A snapshot that may be consistent for one application may not be consistent for another application. Therefore, after generating one snapshot which is consistent for one application, if a consistent point is detected for another application, another snapshot is generated. In this case, the second snapshot probably does not have many changes.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location. The primary volume 104 is typically an expensive, fast, and highly available storage subsystem, whereas the secondary volume 108 is typically cost-effective, high capacity, and comparatively slow (for example, ATA/SATA disks).

Figure 1B:
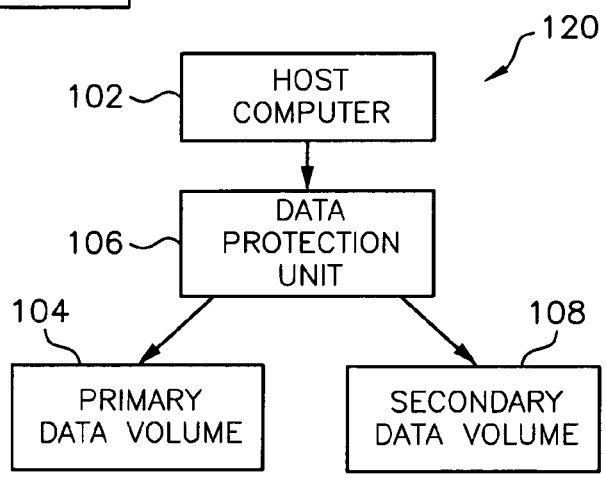

FIG. 1B shows an alternative embodiment of a system 120 constructed in accordance with the present invention. The host computer 102 is directly connected to the data protection unit 106, which manages both the primary data volume 104 and the secondary data volume 108. The system 120 may be slower than the system 100 described above, because the data protection unit 106 must manage both the primary data volume 104 and the secondary data volume 108. This results in a higher latency for writes to the primary volume 104 in the system 120 and lowers the available bandwidth for use.

Figure 1C:
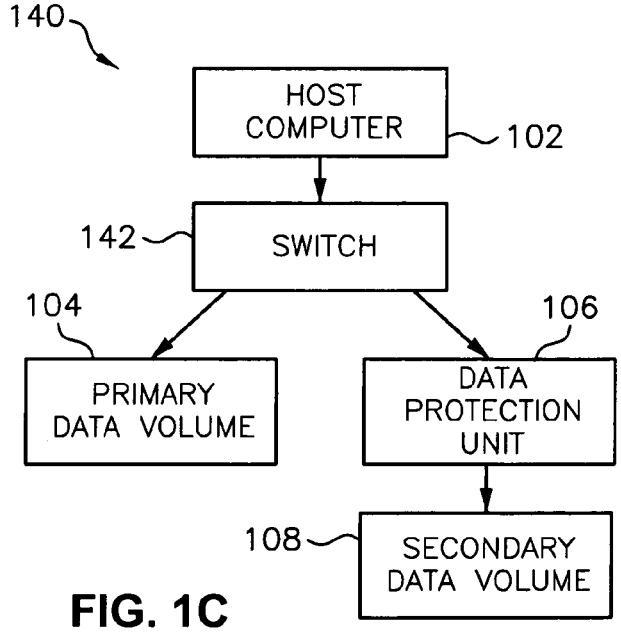

FIG. 1C shows another embodiment of a system 140 constructed in accordance with the present invention. The host computer 102 is connected to an intelligent switch 142. The switch 142 is connected to the primary data volume 104 and the data protection unit 106, which in turn manages the secondary data volume 108. The switch 142 includes the ability to host applications and contains some of the functionality of the data protection unit 106 in hardware, to assist in reducing system latency and improve bandwidth.

It is noted that the data protection unit 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

Figure 2:
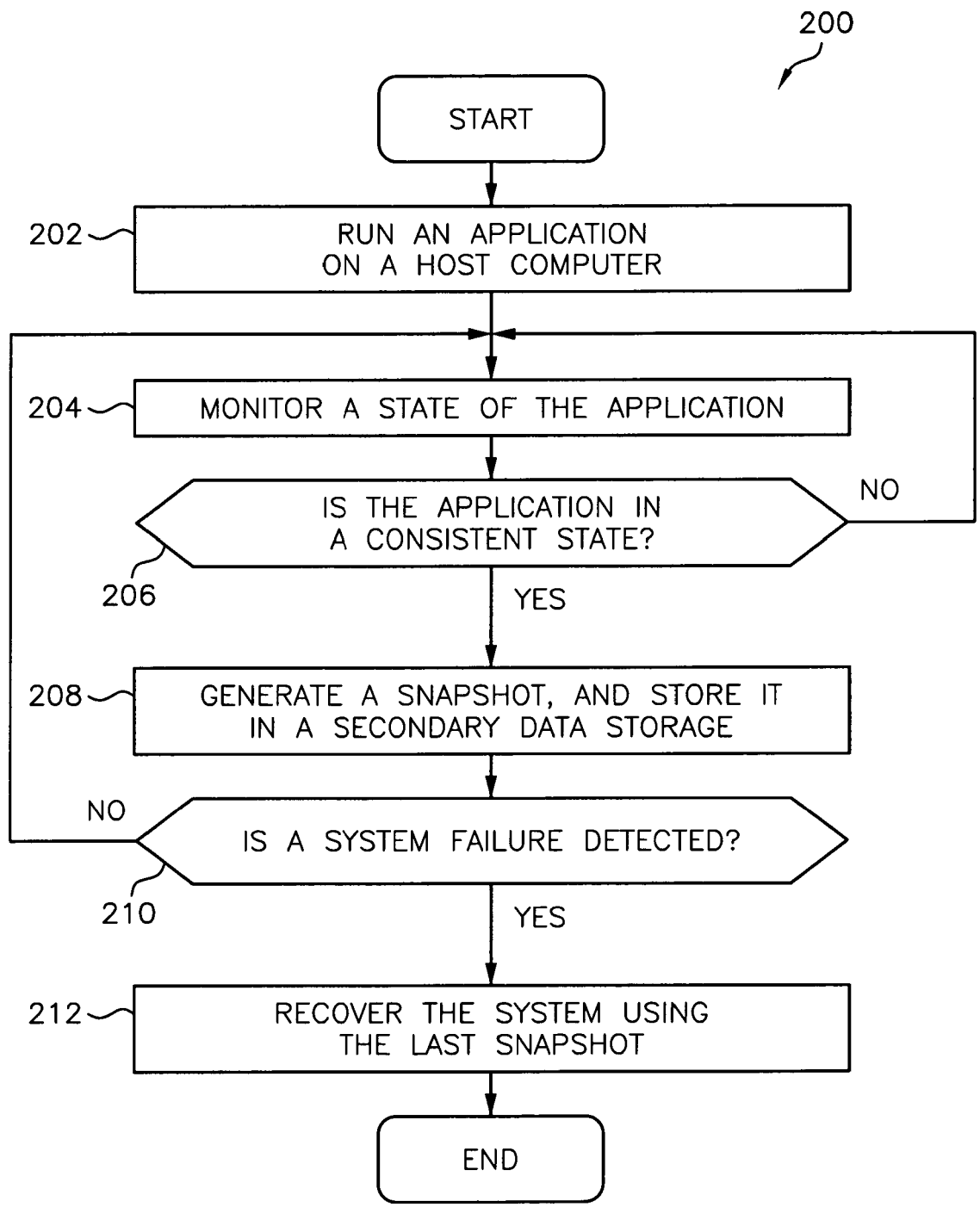
FIG. 2 is a flow diagram of a process for data backup in accordance with one embodiment of the present invention.

FIG. 2 is a flow diagram of a process 200 for data backup in accordance with one embodiment of the present invention. A host computer 102 runs an application (step 202). The output generated by the host computer 102 is preferably, but not necessarily, first stored in a memory in the host computer 102 and later flushed into a primary data volume 104. The data stored in the primary data volume 104 is backed up by a plurality of snapshots generated, periodically or non-periodically, in accordance with a snapshot generation policy. A data protection unit 106 constantly monitors whether the state of the application is consistent (step 204). The application generates information that may be used in determining the state of the application. For example, the application may generate an indicator indicating that the application is in a consistent state. The application may set specific bits to indicate that the memory has to be flushed to the data storage and no dirty buffers are outstanding. Alternatively, it is possible to analyze the log of a journaling system to find out a consistent state when the log is empty.

If the data protection unit 106 determines that the application is not in a consistent state, the process 200 returns to step 204 to monitor the state of the application (step 206). If the data protection unit 106 determines that the application is in a consistent state, which means the output temporarily stored in the memory is flushed into the primary data volume 104, the data protection unit 106 generates a snapshot and stores it in the secondary data volume 108 (step 208). If a system failure or other problem is detected at step 210, the data is restored using the last snapshot (step 212).

Figure 3:
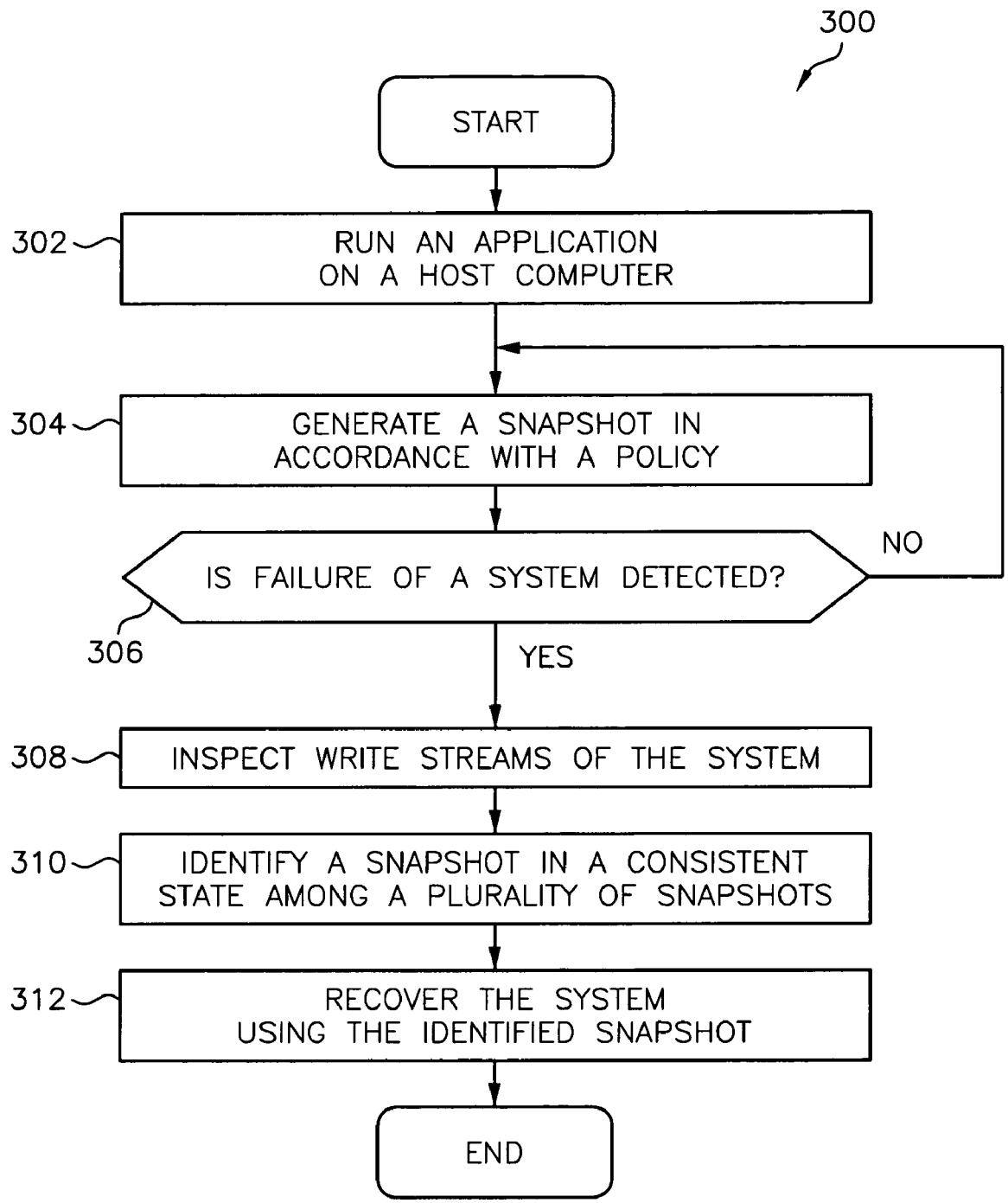
FIG. 3 is a flow diagram of a process for data backup in accordance with another embodiment of the present invention.

FIG. 3 is a flow diagram of a process 300 for data backup in accordance with another embodiment of the present invention. The present invention analyzes the log of write streams to find a consistent point to recover the data in the event of a system failure. The present invention keeps a log of every write made to the primary volume 104 (a "write log") by duplicating each write and directing the copy to the secondary volume 106. The resulting write log on the secondary volume 108 can then be played back one write at a time to recover the state of the primary volume 104 at any previous point in time.

In typical recovery scenarios, it is necessary to examine how the primary volume looked like at multiple points in time before deciding which point to recover to. For example, consider a system that was infected by a virus. In order to recover from the virus, it is necessary to examine the primary volume as it was at different points in time to find the latest recovery point where the system was not yet infected by the virus.

A host computer 102 runs an application (step 302). The output generated by the host computer 102 is first stored in a memory and later flushed into a primary data volume 104. A data protection unit 106 generates a snapshot of the data and stores the snapshot in a secondary data volume 108 (step 304). The snapshots may be generated periodically or non-periodically depending on a snapshot generation policy. If a system failure or other problem is detected at step 306, the data protection unit 106 inspects a log of previous writes. The application updates a log of writes every time it gets output to be recorded in the memory and the primary data volume 104. The data protection unit 106 replays the log of write streams and determines an exact point in time when the application was in a consistent state. The data protection unit 106 identifies a snapshot in a consistent state among a plurality of snapshots (step 310) and restores the data based on the consistent state snapshot (step 312).

The snapshot from which the system is recovered does not have to be absolutely consistent. A snapshot which is generated slightly before or after the consistent point may be utilized. Basically, a snapshot which minimizes the replay of the log is the best snapshot for recovery. The best snapshot may be different from one application to another. Alternatively, when the consistency determination is made in real-time for an application, it is necessary to use a host resident agent that reads non-persistent state information from a memory rather than only analyzing the write data stream.

While specific embodiments of the present invention have been shown and described, many modifications and variations could be made by one skilled in the art without departing from the scope of the invention. The above description serves to illustrate and not limit the particular invention in any way.

What is claimed is:

1. A system for backing up data, the system comprising:
   a host computer configured to run an application, wherein the application generates data that is stored in a buffer of the host computer;
   a primary data storage configured to store the data generated by the application, wherein the data is copied from the buffer of the host computer to the primary data storage upon the occurrence of a specific condition;
   a data protection unit configured to monitor a state of the application and to generate a snapshot for the data stored in the primary data storage when the application is in a consistent state without suspending operation of the application to generate the snapshot, wherein the application generates state information to indicate the consistent state, and wherein the state information includes setting a specific bit to indicate to the data protection unit that the buffer has been flushed out to the primary data storage; and
   a secondary data storage configured to store the snapshot.

2. The system of claim 1 wherein the primary data storage is directly connected to the host computer.

3. The system of claim 1 wherein the data protection unit controls both the primary data storage and the secondary data storage.

4. The system of claim 1 further comprising a switch for connecting the primary data storage and the data protection unit to the host computer.

5. A system for backing up data, the system comprising:
   a host computer configured to run an application, wherein the application generates data that is stored in a buffer of the host computer;
   a primary data storage configured to store the data generated by the application, wherein the data is copied from the buffer of the host computer to the primary data storage upon the occurrence of a specific condition;
   a data protection unit configured to:
   generate a snapshot of the data stored in the primary data storage without suspending operation of the application to generate the snapshot;
   determine when the application was in a consistent state, wherein the application generates state information to indicate the consistent state, and wherein the state information includes setting a specific bit to indicate to the data protection unit that the buffer has been flushed out to the primary data storage; and
   locate a snapshot corresponding to a time when the application was in the consistent state; and
   a secondary data storage configured to store the snapshot.

6. The system of claim 5 wherein the consistent state is determined by inspecting a log of write streams.

7. The system of claim 5 wherein the primary data storage is directly connected to the host computer.

8. The system of claim 5 wherein the data protection unit controls both the primary data storage and the secondary data storage.

9. The system of claim 5 further comprising a switch for connecting the primary data storage and the data protection unit to the host computer.

10. A method for backing up data, comprising the steps of:
    running an application on a host computer, wherein the application generates data that is stored in a buffer of the host computer;
    storing the data generated by the application in a primary data storage, wherein the data is copied from the buffer of the host computer to the primary data storage upon the occurrence of a specific condition;
    monitoring a state of the application to determine if the application is in a consistent state, wherein a consistent state exists when there is no data generated by the application waiting to be written to a primary data storage;
    generating a snapshot for the data stored in the primary data storage when the application is in the consistent state without suspending operation of the application, wherein the application generates state information to indicate the consistent state, and wherein the state information includes setting a specific bit to indicate to the data protection unit that the buffer has been flushed out to the primary data storage; and
    storing the snapshot in a secondary data storage.

11. The method according to claim 10, wherein if a system failure is detected, the method further comprising the step of:
    recovering the system using the snapshot.

12. The method according to claim 10, wherein the monitoring step includes the application generating information to determine the state of the application.

13. The method according to claim 12, wherein the application generates an indicator of the state of the application.

14. The method according to claim 10, wherein the monitoring step includes analyzing a log of a journaling system associated with the application, wherein the application is in the consistent state a point in time when the log is empty at that point in time.

15. The system of claim 1, wherein the consistent state exists when there is no pending data to be written from the buffer to the primary data storage.

16. The system of claim 1, wherein the data protection unit generates snapshots based on consistent states of a plurality of applications.

17. The system of claim 5, wherein the data protection unit generates snapshots based on consistent states of a plurality of applications.

18. The method of claim 10, further comprising:
    generating snapshots based on consistent states of a plurality of applications.

* * * * *